United States Patent
Lehtikuja et al.

(10) Patent No.: US 11,888,828 B2
(45) Date of Patent: Jan. 30, 2024

(54) DOMAIN NAME SYSTEM QUERIES

(71) Applicant: Telefonaktiebolaget LM Ericsson (publ), Stockholm (SE)

(72) Inventors: Niilo Lehtikuja, Espoo (FI); Patrik Salmela, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 282 days.

(21) Appl. No.: 17/295,119

(22) PCT Filed: Nov. 26, 2018

(86) PCT No.: PCT/EP2018/082559
§ 371 (c)(1),
(2) Date: May 19, 2021

(87) PCT Pub. No.: WO2020/108730
PCT Pub. Date: Jun. 4, 2020

(65) Prior Publication Data
US 2022/0006797 A1    Jan. 6, 2022

(51) Int. Cl.
*H04L 9/40*    (2022.01)

(52) U.S. Cl.
CPC ........ *H04L 63/0442* (2013.01); *H04L 63/062* (2013.01); *H04L 2463/062* (2013.01)

(58) Field of Classification Search
CPC ............... H04L 63/0442; H04L 63/062; H04L 2463/062; H04L 61/4511; H04L 61/59; H04L 63/045

USPC .......................................................... 713/164
See application file for complete search history.

(56) References Cited

U.S. PATENT DOCUMENTS

| | | | | |
|---|---|---|---|---|
| 5,966,663 A | * | 10/1999 | Gleason | H04L 9/40 455/466 |
| 2006/0143702 A1 | * | 6/2006 | Hisada | H04L 12/4641 726/15 |
| 2017/0093802 A1 | * | 3/2017 | Norum | H04L 63/0428 |
| 2020/0344208 A1 | * | 10/2020 | Hao | H04L 61/2528 |

OTHER PUBLICATIONS

Saraj et al., 2017 IEEE, 13th International Conference on Emerging Technologies, "Design and Implementation of a Lightweight Privacy extension of DNSSEC protocol", pp. 1-6 (Year: 2017).*

(Continued)

*Primary Examiner* — Khalil Naghdali
(74) *Attorney, Agent, or Firm* — Christopher & Weisberg, P.A.

(57) ABSTRACT

Embodiments relate to a method for secure domain name system, DNS, queries. The method is performed in a DNS client, and the method includes obtaining an encryption key and internet protocol, IP, address for a final DNS resolver, creating a session key, encrypting a DNS query and the created session key with the obtained encryption key, and sending a DNS message containing the encrypted DNS query and the created session key to an intermediate DNS resolver, different from the final DNS resolver, together with the obtained IP address for the final DNS resolver. Methods, nodes, computer programs, and a computer program product for secure DNS queries are also presented.

19 Claims, 3 Drawing Sheets

(56) References Cited

OTHER PUBLICATIONS

International Search Report and Written Opinion dated Aug. 5, 2019 for International Application No. PCT/EP2018/082559 filed Nov. 26, 2018, consisting of 13-pages.
R. Arends et al.; Protocol Modifications for the DNS Security Extensions; Network Working Group; RFC 4035; The Internet Society, Mar. 2005, consisting of 53-pages.
ODNS: Oblivious DNS; Princeton University, Mar. 29, 2018, consisting of 2-pages.
P. Mockapetris.; Domain Names—Implementation and Specification; Network Working Group; RFC 1035; The Internet Society, Nov. 1987, consisting of 49-pages.
Christian Grothoff et al.; Toward Secure Name Resolution on the Internet; ScienceDirect; Computers and Security vol. 77, Aug. 2018, consisting of 15-pages.
Paul Schmitt et al.; Oblivious DNS: Practical Privacy for DNS Queries; Cornell University Library, arXiv:1806.00276v2 [cs.NI]; Jun. 1, 2018, consisting of 17-pages.
W. Wijngaards et al.; Confidential DNS draft-wijngaards-dnsop-confidentialdns-03; DNSOP Working Group; Internet-Draft; IETF Trust, Mar. 6, 2015, consisting of 7-pages.

\* cited by examiner

DOMAIN NAME SYSTEM QUERIES

CROSS-REFERENCE TO RELATED APPLICATIONS

This application is a Submission Under 35 U.S.C. § 371 for U.S. National Stage Patent Application of International Application Number: PCT/EP2018/082559, filed Nov. 26, 2018 entitled "DOMAIN NAME SYSTEM QUERIES," the entirety of which is incorporated herein by reference.

TECHNICAL FIELD

The invention relates to methods, nodes, computer programs and a computer program product for domain name system queries.

BACKGROUND

Domain Name System (DNS) is an essential but often invisible part of the Internet. The DNS gets a user queried information like an Internet Protocol (IP) address (e.g. 93.184.216.34) for a corresponding domain name (e.g. example.com). IP addresses are used for routing traffic in the Internet. Many types of information are available in DNS servers in addition to IP address—domain name mappings, but the IP addresses are the most commonly needed information. DNS is needed because IP addresses are long (especially for IPv6) and hard to remember compared to corresponding human readable domain names.

A DNS client is a machine that sends a DNS query, e.g. to get an IP address corresponding to a domain name.

A DNS resolver is a server that tries to find the right kind of data of a domain name a DNS client queries for. A DNS resolver can have a cache memory that can be used to save common DNS answers, so that the DNS resolver don't need to look for the cached information from other places. The DNS resolver is the most important part when considering security and privacy of a DNS network, because it has access to DNS client identities and DNS query information.

Resource record (RR) is a value a DNS authoritative server owns for some RR types. Different RR types are defined for containing e.g. IP addresses, host information, authoritative name server or other things. For example RR type A is for IPv4 addresses and RR type AAAA is for IPv6 addresses.

A DNS message comprises, according to Internet Engineering Task Force (IETF) standards, as discussed in IETF request for comments (rfc) 1035, 5 parts: Header, Question, Answer, Authority and Additional. A DNS message always has a header but not necessarily all the other parts. The header includes fields that tell which of the other parts that are used in the message. The question part has information needed when querying certain RR from a DNS server. The answer part contains RRs that provides information regarding the answer to the asked question. The authority part contains RRs that point to an authoritative server for the information and the additional field part contains RRs that the server sent but that are not strictly answering the asked question.

A DNS message can thus comprise the following parts:

| Header | |
|---|---|
| Question | question for a name server |
| Answer | RRs answering the question |
| Authority | RRs pointing toward an authority |
| Additional | RRs holding additional information |

The header contains the following fields:

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| \multicolumn{16}{c}{ID} |
| QR | | | OPCODE | | | AA | TC | RD | RA | Z | AD | CD | | RCODE | |
| \multicolumn{16}{c}{QDCOUNT} |
| \multicolumn{16}{c}{ANCOUNT} |
| \multicolumn{16}{c}{NSCOUNT} |
| \multicolumn{16}{c}{ARCOUNT} |

ID is an identity generated by the program sending the DNS query. The program can then identify different queries from each other and map each response to a specific query.

QR is a one bit flag that indicates if a message is a query or response.

OPCODE is a four bit field that indicates the query type the message contains. Zero is used for a standard query. 0-5 are in use and 6 through 15 are reserved for later.

AA is an authoritative answer flag.

TC indicates if the message was truncated because of its length.

RD is recursion desired flag. It tells if the name server can ask recursively for the answer.

RA is recursion available flag that is used with the answer.

Z is a zero bit reserved for future use, set to zero.

AD stands for authenticated data, which is used by DNS Security Extension (DNSSEC).

CD stands for checking disabled, which is used by DNSSEC.

RCODE is the response code field. The value of this field indicates if the request was answered successfully or if some error occurred.

The remaining four 2-byte fields indicate the amount of parts in the last four parts of the message (Questions, Answers, Name servers, and Additional information).

DNS has become one of the most vulnerable parts of the Internet. It is one of the most commonly targeted parts of the Internet by attacks and data gathering because of the lack of security throughout the system. DNSSEC is used to authenticate DNS, but it does not encrypt traffic. Many kinds of methods, such as DNS over transport layer security (TLS) and DNS over hypertext transfer protocol secure (HTTPS), for encrypted DNS traffic are being standardized and have been implemented. These offer encrypted messaging between a DNS client and a DNS resolver, but do not make the DNS use private querying from the resolver to prevent privacy tracking of a user.

Figure 1:
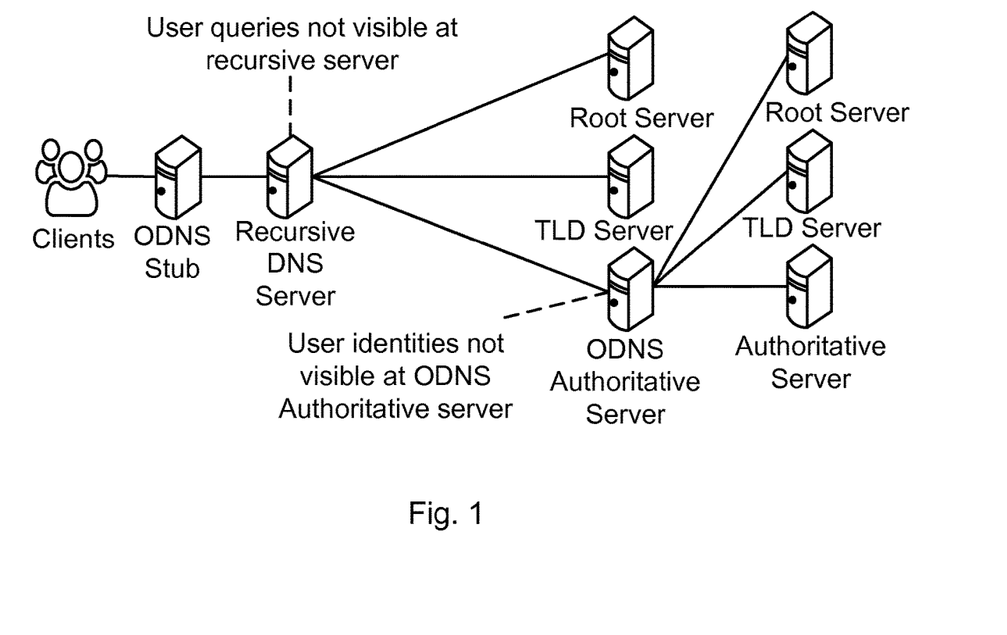
FIG. 1 schematically illustrates ODNS.

Oblivious DNS (ODNS), illustrated in FIG. 1, has a completely different take on DNS security. It is not a standard for using DNS on top of some secure protocol, but a way to get current DNS network secure with added custom servers following the current DNS standards. ODNS is more of an ideological way of protecting user data and privacy and not relying solely on encryption. ODNS involves encrypting the data, but it adds a level of privacy that just plain encrypting would not have. The big benefit of ODNS is that no DNS server knows the client identity and what the client is searching.

The technical solution behind ODNS is a new stub resolver, ODNS Stub, (client side software), an additional ODNS top level domain (TLD, in this case "odns"), such as .com and .fi, and an ODNS authoritative server handling that TLD. Between the added ODNS stub resolver and the ODNS authoritative server in the DNS network is a normal DNS resolver, Recursive DNS Server, that passes searches between them. The recursive DNS resolver keeps client identity to itself so authoritative ODNS server does only see the query, not the client identity. This needs no additions to the legacy DNS system because resolvers don't send client identities to authoritative servers.

The ODNS stub resolver is the second step in the ODNS system right after the client program. It encrypts the domain and a generated session key with the public key of the ODNS authoritative server and adds the "odns" label to the end to create custom encrypted domain name. After encryption the stub resolver sends the DNS request to the DNS resolver. As an example, when the client program requests example.com, the stub server, encrypts the URL (example.com) and the selected session key with the public key of the ODNS authorative server and adds the suffix ".odns" to the cyphertext, resulting in <cyphertext>.odns, e.g. f45def2xergyd1g.odns.

When the response, encrypted with the session key, comes back from the DNS resolver the ODNS stub resolver decrypts it for the client.

A regular DNS resolver is part of the ODNS procedure. It keeps the client IP address to itself and makes a normal DNS search based on the received query (e.g. f45def2xergyd1g.odns) to find the ODNS authoritative server. When the DNS response comes from the ODNS authoritative server the DNS resolver forwards it to the ODNS stub resolver, like it would normally answer the client.

The ODNS authoritative server works like a DNS authoritative server for the ODNS zone and at the same time works as a DNS resolver. Since all queries in ODNS go through the ODNS authoritative resolver it in fact acts as authoritative resolver for all domains. However, no entity sees the ODNS authoritative resolver as an authoritative resolver for anything else than ODNS. Through the ODNS zone the ODNS authoritative resolver acts like an authoritative server for all other domains in DNS, and to the DNS resolver it seems like an authoritative server answering normal DNS queries for the ODNS zone. After the ODNS authoritative server gets an ODNS query it decrypts the message and acts like a normal DNS resolver and makes a query for the domain the client asked (e.g. example.com) (second column of DNS servers, FIG. 1). After the DNS response is gotten the ODNS authoritative server encrypts it again to ODNS format with the session key received when decrypting the query, and sends the response to the DNS resolver as an authoritative for the ODNS zone.

SUMMARY

An object of the present disclosure is to enable security, particularly privacy in DNS, without the need of dedicate additional stub servers and authoritative servers.

According to a first aspect there is presented a method for secure domain name system (DNS) queries. The method is performed in a DNS client and comprise obtaining an encryption key and internet protocol (IP) address for a final DNS resolver, creating a session key, encrypting a DNS query and the created session key with the obtained encryption key, and sending a DNS message containing the encrypted DNS query and the created session key to an intermediate DNS resolver, different from the final DNS resolver, together with the obtained IP address for the final DNS resolver.

By the presented method, existing DNS networks can be used with minor adjustment to existing protocols.

The method may further comprise receiving a DNS message with an encrypted DNS query and answer from the intermediate DNS resolver, and decrypting the received DNS query and answer with the created session key.

The DNS query and the created session key may be sent in the same resource record (RR).

According to a second aspect there is presented a method for secure DNS queries. The method is performed in an intermediate DNS resolver and comprises receiving a DNS message with an encrypted DNS query from a DNS client, together with an IP address for an additional DNS resolver, storing a query ID of and an IP address to the DNS client, and sending a DNS message with the received encrypted DNS query to the additional DNS resolver with the stored IP address to and the query ID of the DNS client replaced with a query ID of the intermediate DNS resolver and an IP address thereto.

The method may further comprise receiving a DNS message with an encrypted DNS query and answer from the additional DNS resolver, and sending the received DNS query and answer to the DNS client based on the stored query ID of the DNS client.

The method may further comprise obtaining the IP address to the DNS client based on the received DNS message from the DNS client.

The DNS query and the created session key may be received in the same RR.

The query ID of the intermediate DNS resolver may be different from the stored query ID of the DNS client.

The step of receiving may comprise decrypting the received encrypted DNS query from a DNS client, to get a next layer of an encrypted DNS query.

According to a third aspect there is presented a method for secure DNS queries. The method is performed in a final DNS resolver and comprises receiving a DNS message with an encrypted DNS query and session key from an intermediate DNS resolver, the received DNS message being without an IP address to, and an query ID of, a DNS client having encrypted the encrypted DNS query and session key, decrypting the received encrypted DNS query and session key, obtaining a DNS answer to the decrypted DNS query, encrypting the DNS answer with the decrypted session key, and sending a DNS message with the encrypted DNS query and answer to the intermediate DNS resolver.

The DNS query and the created session key may be received in the same RR.

The received DNS message may indicate a query ID of the intermediate DNS resolver.

According to a fourth aspect there is presented a DNS client node for secure DNS queries. The DNS client node comprises a processing circuitry and a computer program product storing instructions that, when executed by the processing circuitry, causes the DNS client node to obtain an encryption key and IP address for a final DNS resolver, create a session key, encrypt a DNS query and the created session key with the obtained encryption key, and to send a DNS message containing the encrypted DNS query and the created session key to an intermediate DNS resolver, different from the final DNS resolver, together with the obtained IP address for the final DNS resolver.

According to a fifth aspect there is presented an intermediate DNS resolver node for secure DNS queries. The intermediate DNS resolver node comprises a processing circuitry and a computer program product storing instructions that, when executed by the processing circuitry, causes the intermediate DNS resolver node to receive a DNS message with an encrypted DNS query from a DNS client, together with an IP address for an additional DNS resolver, store a query ID of, and an IP address to, the DNS client, and to send a DNS message with the received encrypted DNS query to the additional DNS resolver with the stored IP address to and the ID of the DNS client replaced with a query ID of the intermediate DNS resolver and an IP address thereto.

According to a sixth aspect there is presented a final secure DNS resolver node for secure DNS queries. The final DNS resolver node comprises a processing circuitry and a computer program product storing instructions that, when executed by the processing circuitry, causes the final DNS resolver node to receive a DNS message with an encrypted DNS query and session key from an intermediate DNS resolver, the received DNS message being without a query ID of, and an IP address to, a DNS client having encrypted the encrypted DNS query and session key, decrypt the received encrypted DNS query and session key, obtain a DNS answer to the decrypted DNS query, encrypt the DNS query and answer with the decrypted session key, and to send a DNS message with the encrypted DNS query and answer to the intermediate DNS resolver.

According to a seventh aspect there is presented a computer program for secure DNS queries. The computer program comprises computer program code which, when run in a DNS client node, causes the DNS client node to obtain an encryption key and IP address for a final DNS resolver, create a session key, encrypt a DNS query and the created session key with the obtained encryption key, and to send a DNS message containing the encrypted DNS query and the created session key to an intermediate DNS resolver, different from the final DNS resolver, together with the obtained IP address for the final DNS resolver.

According to an eighth aspect there is presented a computer program for secure DNS queries. The computer program comprising computer program code which, when run in an intermediate DNS resolver node, causes the intermediate DNS resolver node to receive a DNS message with an encrypted DNS query from a DNS client, together with an IP address for an additional DNS resolver, store a query ID of and an IP address to the DNS client, and to send a DNS message with the received encrypted DNS query to the additional DNS resolver with the stored query ID of and the IP address to the DNS client replaced with a query ID of the intermediate DNS resolver and an IP address thereto.

According to a ninth aspect there is presented a computer program for secure DNS queries. The computer program comprises computer program code which, when run in a final DNS resolver node, causes the final DNS resolver node to receive a DNS message with an encrypted DNS query and session key from an intermediate DNS resolver, the received DNS message being without a query ID of and an IP address to a DNS client having encrypted the encrypted DNS query and session key, decrypt the received encrypted DNS query and session key, obtain a DNS answer to the decrypted DNS query, encrypt the DNS query and answer with the decrypted session key, and to send a DNS message with the encrypted DNS query and answer to the intermediate DNS resolver.

A computer program product comprising a computer program and a computer readable storage means on which the computer program is stored is also presented.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

A domain name system (DNS) client is a node in a DNS network that sends a DNS query.

A DNS resolver is a node in a DNS network that tries to find an answer to the question in a received DNS query.

A DNS message may comprise 5 parts, according to Internet Engineering Task Force (IETF) standards: Header, Question, Answer, Authority and Additional. A DNS message always has a header but not necessarily all the other parts.

A more secure and private DNS is presented for enveloped DNS queries that hide the client identity by using two or more different DNS resolvers to communicate with the client and make the DNS search. This is achieved with a new OPCODE type for DNS and adding additional A or AAAA resource records (RRs) to the DNS query, so that the first or intermediate DNS resolver is able to envelope the DNS query to a second or final DNS resolver. Additionally, a session key is sent with the query for encrypting the answer.

The query and the session key are encrypted with the public key of the final resolver. After the final resolver has performed the DNS query it will encrypt the answer with the session key and send it to the intermediate resolver which forwards the encrypted answer to the client.

An enveloped query is a kind of query, in which the DNS resolver, which receives a DNS query from a DNS client, will request a second intermediate DNS resolver to do all the job of fetching the answer, but then itself returns the response back to the DNS client. During this process, the second intermediate DNS resolver might also query other DNS servers in the Internet, on behalf of the DNS client, for the answer. With the presented embodiments the query itself is not visible to the intermediate resolvers as it is encrypted with the public key of the final resolver and the intermediate resolvers obtain information about how to forward the query from the received query.

With the presented embodiments, addition of anonymity/privacy in DNS is achieved. The presented embodiments provide the same level of anonymity and security for the DNS as the ODNS provides, but without the need for additional network of dedicated servers. Changes to the DNS infrastructure are small and easy to deploy.

Further, the presented embodiments do not take two full DNS searches as ODNS does, but instead one additional step from one DNS resolver to another. This will also achieve speed advantage over ODNS.

A user may also select which DNS server/provider to use and is not limited to a specific one like in ODNS.

The presented embodiments changes things in how DNS messages are used as well as how DNS clients and DNS resolvers need to handle the DNS messages.

The change to the DNS message header is the use of a new OPCODE for enveloped query. This code could be 6 or any other remaining unassigned code assigned for it. Other changes to the message may be that a new error code for not supporting enveloped DNS can be added and that there may be an additional RR sent with a query. An A or AAAA record for a second intermediate DNS resolver's IP address and/or only for the final DNS resolver's IP address will be sent with the question so that the intermediate resolver will know where to forward it. An encrypted session key will be added to the message. The message may optionally contain more than one A/AAAA record identifying further DNS resolvers in an enveloped way, in which case the query should be encrypted by the public keys of the corresponding intermediate resolvers in correct order (i.e. last with key of first IP in the list). This way the query can be passed from intermediate resolver to intermediate resolver, each decrypting the query until the final resolver has a valid domain name to resolve. This can make queries even harder to track as the encrypted query sent by the first intermediate resolver to the second resolver, will be different than what is sent from the second to the third resolver and so on. For each round of encryption, the next resolver's IP address is included in the encryption. This way, the first resolver gets a message with only an encrypted question, encrypted with its public key. When the first resolver decrypts it, it gets the IP address of the next resolver and the next layer of the encrypted question, and the first resolver can forward the result of the decryption (excluding the IP address of the next resolver) to the next resolver. The next resolver does the same operation, until the final resolver decrypts the question it received and gets the domain name to resolve and the session key generated by the client. The resolvers may get an encrypted question with the IP address of the next resolver in a separate A/AAAA record.

With an example of only one intermediate resolver, the client may perform two encryptions:
1) Encrypt the original question (and optionally the session key if included in the same RR) with key of the final resolver.
2) Encrypt the result of 1) and the IP address of final resolver with the key of intermediate resolver.

The output of 2) is sent as question to intermediate resolver, which decrypts it and forwards the content (excluding the IP address of the final resolver) to the final resolver. However, it requires two encryption processes and 2) may be skipped and then including the IP address of the final resolver in A/AAAA RR sent to the intermediate resolver together with the result of 1)

The DNS client will need to do these things differently compared to standard DNS. The client will need the public key of the final resolving resolver, and optionally all intermediary resolvers, especially when using multiple intermediate resolvers. The client will need to create its own session key, and to encrypt the query and the session key with the final resolver's public key. The client will then create a modified DNS query, compared to standard DNS queries. When the client receives a DNS response, it will decrypt it with its own session key.

The DNS resolvers will need to be able to differentiate OPCODE 0 from (e.g.) OPCODE 6. OPCODE 0 is for normal query and 6 is for enveloped DNS query. When receiving an enveloped DNS query an intermediate DNS resolver needs to take care of the following. The intermediate DNS resolver creates a state or session for a received/ongoing query, including e.g. the senders IP address and identity (ID) of the query for returning the answer. The received data is stored in a database or memory connected to an IP address of the DNS client, an ID of the received query, and an ID of the query sent to the next resolver. The intermediate DNS resolver then forwards the query to the IP address of the next intermediate resolver or final DNS resolver, e.g. found in the next A or AAAA record in additional RRs, and not sharing the sender IP address or ID with the next DNS resolver. When the intermediate DNS resolver receives a response, the ID of the received response is used match it with the corresponding stored ID, and the response is sent back to the corresponding IP address of the DNS client together with its corresponding ID.

The final DNS resolver needs to decrypt the question with its own private key corresponding to its public key used for decrypting the query. The final DNS resolver then searches the answer to the DNS query in a standard way. After the answer has been found, the final DNS resolver encrypts the answer with the session key and sends it back to the intermediate DNS resolver.

A standard DNS query may be configured in the following way.

Transaction ID: 0x241a
Flags: 0x0100 (i.e. standard query)
    0... .... .... .... = Response: Message is a query
    .000 0... .... .... = Opcode: Standard query (0)
    .... .0.. .... .... = Truncated: Message is not truncated
    .... ...1 .... .... = Recursion desired: Do query recursively
    .... .... .0.. .... = Z: reserved (0)
    .... .... ...0 .... = Non-authenticated data OK: Non-authenticated data is unacceptable
Questions: 1
Answer RRs: 0

-continued

```
    Authority RRs: 0
    Additional RRs: 0
    Queries
        www.example.com: type A, class IN
```

The standard DNS response will then be configured in the following way.

```
Transaction ID: 0x241a
    Flags: 0x8180 (Standard query response, No error)
        1... .... .... .... = Response: Message is a response
        .000 0... .... .... = Opcode: Standard query (0)
        .... ..0. .... .... = Authoritative: Server is not an authority for
domain
        .... ..0. .... .... = Truncated: Message is not truncated
        .... ...1 .... .... = Recursion desired: Do query recursively
        .... .... 1... .... = Recursion available: Server can do recursive
queries
        .... .... .0.. .... = Z: reserved (0)
        .... .... ..0. .... = Answer authenticated: Answer/authority portion
was not authenticated by the server
        .... .... .... 0000 = Reply code: No error (0)
    Questions: 1
    Answer RRs: 1
    Authority RRs: 0
    Additional RRs: 0
    Queries
        www.example.com: type A, class IN
Answers
        www.example.com: type A, class IN, addr 258.8.8.8
```

An enveloped DNS query, with one intermediate resolver (owning PUB/PRIV_KEY2), may be configured in the following way.

```
Transaction ID: 0x241a
    Flags: 0x3100 (Standard query)
        0... .... .... .... = Response: Message is a query
        .011 0... .... .... = Opcode: Enveloped query (6)
        .... ..0. .... .... = Truncated: Message is not truncated
        .... ...1 .... .... = Recursion desired: Do query recursively
        .... .... .0.. .... = Z: reserved (0)
        .... .... ...0 .... = Non-authenticated data OK: Non-authenticated
data is unacceptable
    Questions: 1
    Answer RRs: 0
    Authority RRs: 0
    Additional RRs: 0
    Queries
        ENCRYPTED_w_PUB_KEY2(ENCRYPTED_w_PUB_KEY1(www.exa
mple.com: type A, class IN, <SESSION_KEY>), <NEXT RESOLVER IP>)
```

Where <NEXT RESOLVER IP> could either be just the IP address of the next hop resolver (final resolver in this particular case), or the IP address encoded as an A/AAAA record. When the intermediate resolver decrypts the question with PRIV_KEY2 it gets the query encrypted with PUB_KEY1, key of the final resolver, and the IP of the final resolver.

Alternatively, the <NEXT RESOLVER IP> could be included unencrypted as an A/AAAA record, in which case the main Query would look like:
ENCRYPTED_w_PUB_KEY1(www.example.com: type A, class IN, <SESSION_KEY>)
The <NEXT RESOLVER IP> record could then be included as an additional query, as an A/AAAA record, i.e. the Queries would look like:

```
    Queries
        ENCRYPTED_w_PUB_KEY1(www.example.com: type A, class
IN, <SESSION_KEY>)
        <NEXT RESOLVER IP>
```

This also means that the "Questions: 1" would change to "Questions: 2" to match. The <NEXT RESOLVER IP> could also be included as something else than a question, e.g. as an Additional RR. In this case the full query would look like:

```
Transaction ID: 0x241a
    Flags: 0x3100 (Standard query)
        0... .... .... .... = Response: Message is a query
        .011 0... .... .... = Opcode: Enveloped query (6)
        .... ..0. .... .... = Truncated: Message is not truncated
        .... ...1 .... .... = Recursion desired: Do query recursively
        .... .... .0.. .... = Z: reserved (0)
        .... .... ...0 .... = Non-authenticated data OK: Non-authenticated
data is unacceptable
    Questions: 1
    Answer RRs: 0
    Authority RRs: 0
    Additional RRs: 1
    Queries
        ENCRYPTED_w_PUB_KEY1(www.example.com: type A,
class IN, <SESSION_KEY>)
    Additional records
        <NEXT RESOLVER IP>
In this case the "Additional RRs" counter would be changed from 0 to 1
to match the content.
```

The enveloped DNS response may then be configured in the following way.

```
Transaction ID: 0x241a
    Flags: 0xb180 (Standard query response, No error)
        1... .... .... .... = Response: Message is a response
        .011 0... .... .... = Opcode: Standard query (6)
        .... ..0. .... .... = Authoritative: Server is not an authority
for domain
        .... ..0. .... .... = Truncated: Message is not truncated
        .... ...1 .... .... = Recursion desired: Do query recursively
        .... .... 1... .... = Recursion available: Server can do recursive
queries
        .... .... .0.. .... = Z: reserved (0)
        .... .... ..0. .... = Answer authenticated: Answer/authority portion
was not authenticated by the server
        .... .... .... 0000 = Reply code: No error (0)
    Questions: 1
    Answer RRs: 1
    Authority RRs: 0
    Additional RRs: 0
    Queries
```

ENCRYPTED_w_SESSION_KEY(www.example.com: type A, class IN, <SESSION_KEY>)
   Answers
      ENCRYPTED_w_SESSION_KEY(www.example.com: type A, class IN, addr 258.8.8.8)

The Query part of the above example could also be replaced with the content encrypted with the public key of the final resolver, i.e. the content of "Queries" would be identical to what the final resolver received:
ENCRYPTED_w_PUB_KEY1 (www.example.com: type A, class IN, <SESSION_KEY>)

The client would not be able to decrypt this, but it could match it against the encrypted query it sent out originally.

Figure 2:
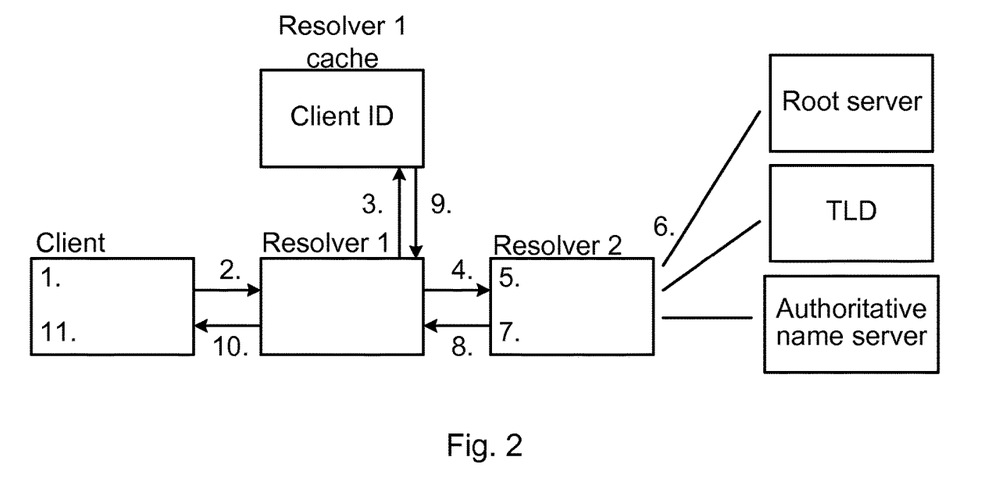
FIG. 2 schematically illustrates enveloped DNS according to an embodiment presented herein.

An enveloped DNS query procedure according to an embodiment is presented with reference to FIG. 2. Before creating a DNS message for a query the DNS client needs to select which final DNS resolver, resolver 2, it wants to use and obtain the final DNS resolver's public key (or all resolvers through which it wants to securely envelope the query). The public key may e.g. be obtained from a web page of the DNS server operator. If it is operated by the client's Internet service provider (ISP), it could be obtained through service discovery when attaching to the network. The public key may be stored in DNS, e.g. in IPSECKEY RR and the DNS client may query it from the DNS. Basically in any way any public key is obtained in any public key infrastructure (PKI). After that the sequence of events in enveloped DNS query goes as illustrated in the FIG. 2. One intermediate resolver is used in this embodiment, but more than one intermediate DNS resolver may be used.

1. The DNS client encrypts the query and a generated session key with the public key of the final DNS resolver.

The client then creates a DNS message for the query with e.g. OPCODE 6 and adds the IP address of the final DNS server to the additional RR in the message. The message thus includes the encrypted question and session key. The encrypted session key may optionally be sent in a separate RR, but having it encrypted together with the uniform resource locator (URL) will result in different cypher texts for each query for the same URL. Without it, even different clients querying the same URL would end up with the same cypher text and thus the encrypted URLs could more easily be identified.

2. The DNS client sends the message to an intermediate DNS resolver, resolver 1, typically provided by an ISP through service discovery, but could also be e.g. manually configured by the user. The same applies for the final DNS resolver, but may be beneficial for the user to select resolvers from different providers to further reduce risk of linking queries to the users.

3. The intermediate DNS resolver stores and maintains a state/session for the query, including the IP address and the original ID of the DNS client. This is obtained from the ID field of the DNS header and is used for mapping responses to requests. For privacy reasons, the intermediate DNS resolver (and possible further intermediate DNS resolvers) and the final resolver should not use the same ID as they receive in the query when they perform further queries, i.e. different IDs for each hop of the chain of resolvers.

4. The intermediate DNS resolver, based on the OPCODE 6, takes the IP address provided in the additional RR and sends the DNS message to the final DNS resolver using its own IP address as source address and an own ID (different from the received ID) in the DNS header.

Additional security can be gained by not including the intermediate resolver IP address in the DNS message in unencrypted format, especially when enveloping multiple resolvers and thus dropping the IPs which have already been used. The next hop IP address may here be included in the encrypted query received by the intermediate resolver. The intermediate resolver can then decrypt the query to get the next level of encrypted query and the IP address of the next intermediate or final resolver. The full list of IP addresses to traverse may alternatively be included as unencrypted RRs, but it would make tracking the query easier. When only one intermediate resolver is used, which may be a typical case, the encrypted query received by the intermediate resolver may, as discussed above, contain the IP address of the next (final in this case) resolver and the next level of encrypted query. The intermediate resolver can decrypt the received encrypted query and get the next level of encrypted query and the IP address where the query should be forwarded. To reduce computation, it may also be possible that the message received by the intermediate resolver does not need to be decrypted by it, instead it contains the IP address of the next (final in this case) resolver in plain text, as its own RR, and the encrypted query intended for the next resolver, i.e. that the next resolver can decrypt with its key. The intermediate resolver in this case drops the IP address and forwards the query to the indicated next resolver. Compared to the case where the intermediate resolver has to decrypt the received query to obtain the IP of the next resolver, this solution would make it possible to track the query from intermediate to final resolver as the query would remain the same. However, the privacy of the query itself would still remain protected.

If the intermediate DNS resolver is not capable of handling enveloped DNS it sends a case specific error to the DNS client.

5. The final resolver receives the DNS message and decrypts the question and session key with its private key.

If the final DNS resolver is not capable of handling enveloped DNS it sends a case specific error to the intermediate DNS resolver.

6. The final DNS resolver makes the DNS search using an own ID different from the received ID.

7. The final DNS resolver encrypts the question and answers with the received session key. Optionally, the question and session key may be encrypted with the public key of the final DNS resolver, wherein the DNS client may compare it with the encrypted query is sent out in the first place. The received encrypted question may alternatively be reused in the answer.

8. The final DNS resolver sends the encrypted response to the intermediate DNS resolver, together with the ID used by the intermediate DNS resolver for this message exchange.

9. The intermediate DNS resolver maps the received encrypted response to the question received from the client by the ID used by the intermediate resolver.

10. The intermediate DNS resolver sends the DNS response message to the DNS client IP address based on the maintained state, together with the ID used by the DNS client for this message exchange.

11. The DNS client receives the DNS response message and decrypts it with the session key.

The usage of OPCODE 6 may be replaced with the usage of the remaining Z bit as a flag. OPCODES 6-15 may thus be used to indicate the use of enveloped DNS, or Z may be used together with OPCODE 0 to indicate the use of enveloped DNS.

The public key of the final resolver may be in a X.509 public key certificate, available as a raw-public key, or possibly a DNSKEY, IPSECKEY, or other suitable RR, of which the final resolver would have the private counterpart. This would require that resolvers capable of enveloped DNS would have DNSKEY pairs of their own. These key pairs would not be related to DNSSEC. The time loss of getting the final resolver's public key would be mitigated if the validity time of the key would be long, which they typically are, such that it can be reused several times.

The session key may instead be separately included in the message as an additional RR encrypted separately with the resolver's public key. Having it inside the question would remove the need for two encryptions and decryptions, but would create the need to change also the question format, e.g. through defining how to separate the secret from the domain name. However, it also adds randomness to the input, making the cipher text for all queries for the same URL different (assuming the session key is changed for each query).

The IP protocol may be limited to IPv6 for excluding older resolvers from the system.

If the client wants to use multiple hops it can create a chain of resolvers to use. The session key should be encrypted with the public key of the final resolver in the chain, i.e. the one actually answering the question. To make the question difficult to track, each resolver in the chain should only get an encrypted question and one "next hop" resolver IP address, the rest of the resolver addresses may be included in the encrypted question or as separate encrypted fields. This means that the DNS client needs the public keys of each resolver in the chain, and the encrypted question when using two intermediate resolvers may be constructed as follows, wherein E( ) means encryption, and IP(resolver_n) means IP address of n:th resolver:

question: E(E(E(example.com), IP(resolver_3)), IP(resolver_2))

Resolver 1 (first one to be contacted) would get the above question and decrypt it to get: E(E(example.com), IP(resolver_3))+IP(resolver_2)

Resolver 1 would learn from this learn the IP of the next hop (resolver_2) and forward the remaining encrypted content (E(E(example.com), IP(resolver_3))) there Resolver 2 would decrypt it to get:
E(example.com)+IP(resolver_3)
It would forward the encrypted content to the next hop (resolver_3)

Resolver 3, being the final DNS resolver, would decrypt the received question and get example.com, and of course also the client generated session key. The session key is not shown in the example but would be include in the query reaching the final resolver, either in a separate RR, encrypted with the public key of the resolver, or as part of E(example.com), e.g. E(session_key, example.com)

If having the next hops in a separate RR, they could either be one hop per RR (in correct order so the resolvers can understand to only decrypt the one which has been encrypted with its public key) or all hops in one RR, in a similar recursive way as above.

Figure 3:
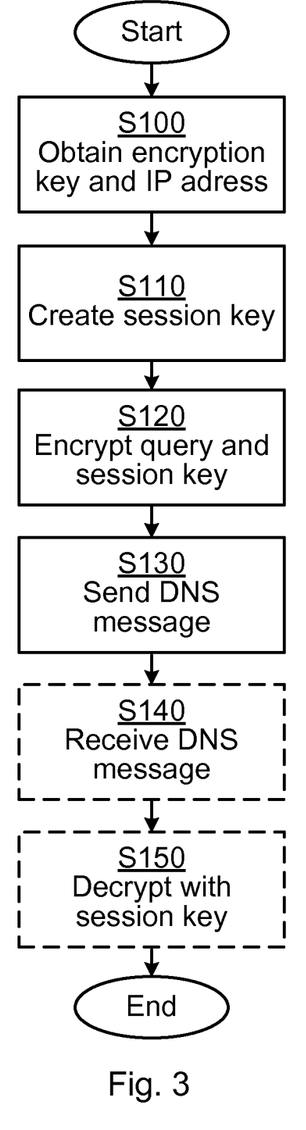
FIGS. 3-5 are flow charts illustrating methods for embodiments presented herein.

An embodiment of a method for secure DNS queries is presented with reference to FIG. 3. The method is performed in a DNS client, and the method comprises obtaining S100 an encryption key and IP address for a final DNS resolver, creating S110 a session key, encrypting S120 a DNS query and the created session key with the obtained encryption key, and sending S130 a DNS message containing the encrypted DNS query and the created session key to an intermediate DNS resolver, different from the final DNS resolver, together with the obtained IP address for the final DNS resolver.

The DNS message may indicate a query ID of, and the IP address to, the DNS client.

The method may further comprise receiving S140 a DNS message with an encrypted DNS query and answer from the intermediate DNS resolver, and decrypting S150 the received DNS query and answer with the created session key.

The DNS query and the created session key may be sent in the same RR. They may be encrypted together.

Figure 4:
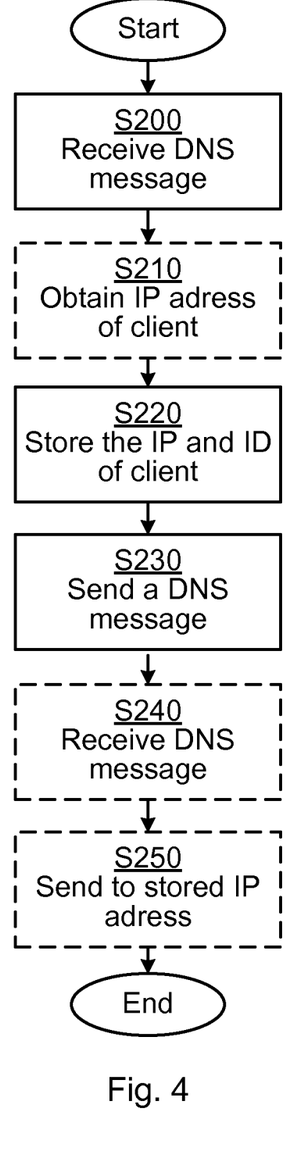

An embodiment of a method for secure DNS queries is presented with reference to FIG. 4. The method is performed in an intermediate DNS resolver, and the method comprises receiving S200 a DNS message with an encrypted DNS query from a DNS client, together with an IP address for an additional DNS resolver, storing S220 a query ID of, and an IP address to, the DNS client, and sending S230 a DNS message with the received encrypted DNS query to the additional DNS resolver with the stored ID of and IP address to the DNS client replaced with a query ID of the intermediate DNS resolver and an IP address thereto. The DNS client may in this case be another intermediate DNS resolver when multiple intermediate resolvers are used. The intermediate DNS resolver may also store the query ID of the intermediate DNS resolver.

The received DNS message may further be stored, allowing further contacts with subsequent servers. The received encrypted DNS query also contains the session key created by the DNS client. The sent DNS message is completely anonymous regarding the DNS client from which the intermediate DNS resolver received the encrypted DNS query.

The method may further comprise receiving S240 a DNS message with an encrypted DNS query and answer from the additional DNS resolver, and sending S250 the received DNS query and answer to the DNS client based on the stored query ID of the DNS client, the IP address of the DNS client, and the stored query ID of the DNS resolver.

The received DNS query and answer may be sent to the IP address of the DNS client.

The method may further comprise obtaining S210 the IP address to the DNS client based on the received DNS message from the DNS client.

The DNS query and the created session key may be received in the same RR. They may be encrypted together.

The query ID of the intermediate DNS resolver may be different from the stored query ID of the DNS client.

The indicated ID is used by the intermediate DNS resolver to map the sent DNS message to the received encrypted DNS query.

The step of receiving S200 may comprise decrypting the received encrypted DNS query from a DNS client, to get a next layer of an encrypted DNS query.

The intermediate DNS resolver may be in a chain of resolvers, and the message may in such a case be received from another intermediate DNS resolver instead of directly from the DNS client.

Figure 5:
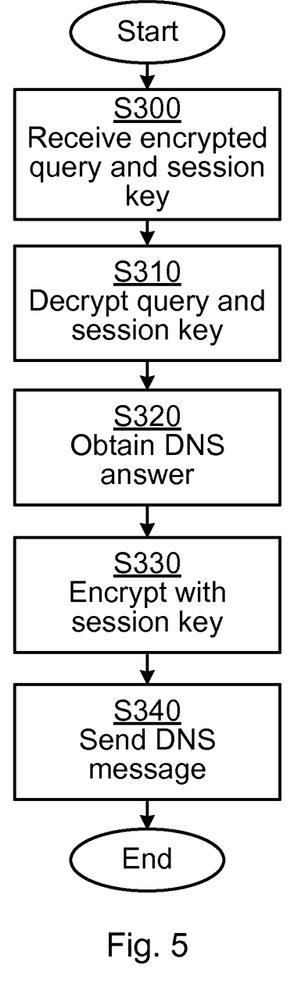

An embodiment of a method for secure DNS queries is presented with reference to FIG. 5. The method is performed in a final DNS resolver, and comprises receiving S300 a DNS message with an encrypted DNS query and session key from an intermediate DNS resolver, the received DNS message being without an IP address to, and an query ID of, a DNS client having encrypted the encrypted DNS query and session key, decrypting S310 the received encrypted DNS query and session key, obtaining S320 a DNS answer to the decrypted DNS query, encrypting S330 the DNS query and answer with the decrypted session key, and sending S340 a DNS message with the encrypted DNS query and answer to the intermediate DNS resolver. Decryption may be done by using the private key of the DNS resolver.

The DNS query and the created session key may be received in the same RR. They may be encrypted together.

The received DNS message may indicate a query ID of the intermediate DNS resolver.

The decryption may be made with the use of a private key of the final DNS resolver.

Figure 6:
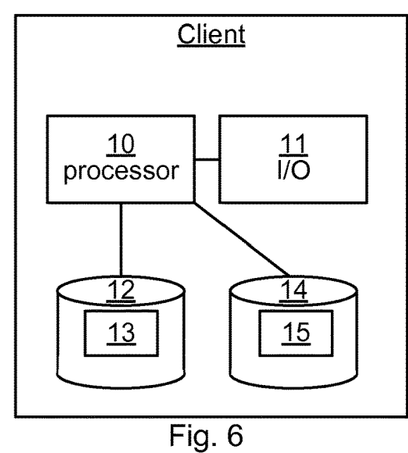
FIGS. 6-8 are schematic diagrams illustrating some components of devices presented herein.

An embodiment of a DNS client node for secure DNS queries is presented with reference to FIG. 6. The DNS client node comprises a processing circuitry 10 and a computer program product 12, 14 storing instructions 13, 15 that, when executed by the processing circuitry, causes the DNS client node to obtain an encryption key and IP address for a final DNS resolver, create a session key, encrypt a DNS query and the created session key with the obtained encryption key, and to send a DNS message containing the encrypted DNS query and the created session key to an intermediate DNS resolver, different from the final DNS resolver, together with the obtained IP address for the final DNS resolver.

The DNS client node may further be caused to receive a DNS message with an encrypted DNS query and answer from the intermediate DNS resolver, and to decrypt the received DNS query and answer with the created session key.

The DNS query and the created session key may be sent in the same RR.

FIG. 6 is a schematic diagram showing some components of the DNS client node Client. The processing circuitry 10 may be provided using any combination of one or more of a suitable central processing unit, CPU, multiprocessing circuitry, microcontroller, digital signal processing circuitry, DSP, application specific integrated circuit etc., capable of executing software instructions of a computer program 13 stored in a memory. The memory can thus be considered to be or form part of the computer program product 12. The processing circuitry 10 may be configured to execute methods described herein with reference to FIG. 3.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processing circuitry 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the DNS client node.

The DNS client node may further comprise an input/output (I/O) interface ii including e.g. a user interface. The DNS client node may further comprise a receiver configured to receive signalling from other nodes, and a transmitter configured to transmit signalling to other nodes (not illustrated). Other components of the DNS client node are omitted in order not to obscure the concepts presented herein.

Figure 9:
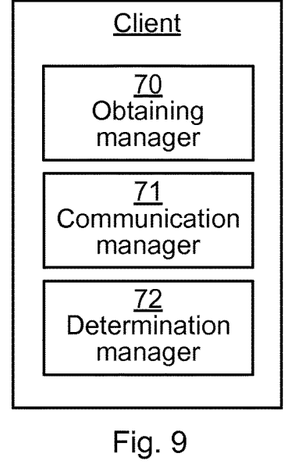
FIGS. 9-11 are schematic diagrams illustrating functional modules of devices presented herein.

An embodiment of a DNS client node for secure DNS queries is presented with reference to FIG. 9. The DNS client node comprises an obtaining manager 70 for obtaining S100 an encryption key and IP address for a final DNS resolver, a determination manager 72 for creating Silo a session key, and a communication manager 71 for encrypting S120 a DNS query and the created session key with the obtained encryption key and for sending S130 a DNS message containing the encrypted DNS query and the created session key to an intermediate DNS resolver, different from the final DNS resolver, together with the obtained IP address for the final DNS resolver.

FIG. 9 is a schematic diagram showing functional blocks of the DNS client node. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the method illustrated in FIG. 6, comprising an obtaining manager unit 70, a communication manager unit 71 and a determination manger unit 72. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The obtaining manger 70 is for secure DNS queries. This module corresponds to the step S100 of FIG. 3. This module can e.g. be implemented by the processing circuitry 10 of FIG. 6, when running the computer program.

The communication manager 71 is for secure DNS queries. This module corresponds to the steps S120, S130, S140 and S150 of FIG. 3. This module can e.g. be implemented by the processing circuitry 10 of FIG. 6, when running the computer program.

The determination manger 72 is for secure DNS queries. This module corresponds to the step S110 of FIG. 3. This module can e.g. be implemented by the processing circuitry 10 of FIG. 6, when running the computer program.

An embodiment of a computer program 13, 15 for secure DNS queries is presented with reference to FIG. 6. The computer program comprises computer program code which, when run in a DNS client node, causes the DNS client node to obtain an encryption key and IP address for a final DNS resolver, create a session key, encrypt a DNS query and the created session key with the obtained encryption key, and to send a DNS message containing the encrypted DNS query and the created session key to an intermediate DNS resolver, different from the final DNS resolver, together with the obtained IP address for the final DNS resolver.

A computer program product 12, 14 comprising a computer program 13, 15 and a computer readable storage means on which the computer program 13, 15 is stored, is also presented.

Figure 7:
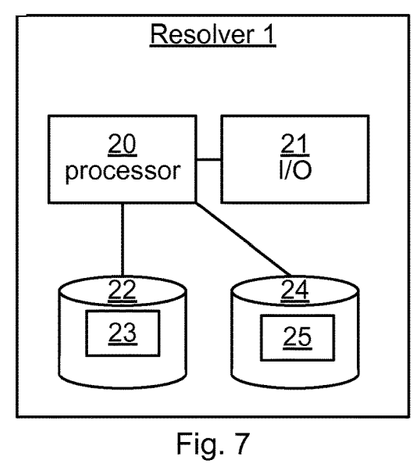

An embodiment of an intermediate DNS resolver node for secure DNS queries is presented with reference to FIG. 7. The intermediate DNS resolver node comprises a processing circuitry 20 and a computer program product 22, 24 storing instructions 23, 25 that, when executed by the processing circuitry, causes the intermediate DNS resolver node to receive a DNS message with an encrypted DNS query from a DNS client, together with an IP address for an additional DNS resolver, store a query ID of, and an IP address to, the DNS client, and to send a DNS message with the received encrypted DNS query to the additional DNS resolver with the stored IP address to, and the ID of, the DNS client replaced with a query ID of the intermediate DNS resolver and an IP address thereto.

The intermediate DNS resolver node may further be caused to receive a DNS message with an encrypted DNS query and answer from the additional DNS resolver, and to send the received DNS query and answer to the DNS client based on the stored query ID of the DNS client.

The intermediate DNS resolver node may further be caused to obtain the IP address to the DNS client based on the received DNS message from the DNS client.

The DNS query and the created session key may be received in the same RR.

The query ID of the intermediate DNS resolver may be different from the stored query ID of the DNS client.

The intermediate DNS resolver may further be caused to decrypt the received encrypted DNS query from the DNS client, to get a next layer of encrypted DNS query.

FIG. 7 is a schematic diagram showing some components of the intermediate DNS resolver node Resolver 1. The processing circuitry 20 may be provided using any combination of one or more of a suitable central processing unit, CPU, multiprocessing circuitry, microcontroller, digital signal processing circuitry, DSP, application specific integrated circuit etc., capable of executing software instructions of a computer program 23 stored in a memory. The memory can thus be considered to be or form part of the computer program product 22. The processing circuitry to may be configured to execute methods described herein with reference to FIG. 4.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 24 in the form of a data memory may also be provided, e.g. for reading and/or storing data during execution of software instructions in the processing circuitry 20. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 25, to improve functionality for the intermediate DNS resolver node.

The intermediate DNS resolver node may further comprise an input/output (I/O) interface 21 including e.g. a user interface. The intermediate DNS resolver node may further comprise a receiver configured to receive signalling from other nodes, and a transmitter configured to transmit signalling to other nodes (not illustrated). Other components of the intermediate DNS resolver node are omitted in order not to obscure the concepts presented herein.

Figure 10:
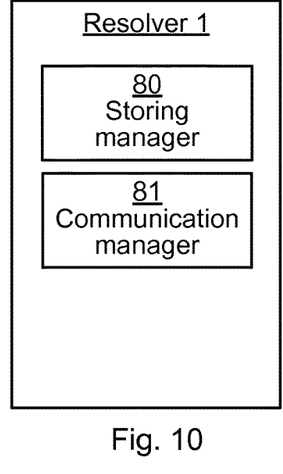

An embodiment of an intermediate DNS resolver node for secure DNS queries is presented with reference to FIG. 10. The intermediate DNS resolver node comprises a storing manager 80 for storing S220 a query ID of, and an IP address to, a DNS client, and a communication manger 81 for receiving S200 a DNS message with an encrypted DNS query from the DNS client, together with an IP address for an additional DNS resolver and for sending S230 a DNS message with the received encrypted DNS query to the additional DNS resolver with the stored query ID of, and the IP address to, the DNS client replaced with a query ID of the intermediate DNS resolver and an IP address thereto.

FIG. 10 is a schematic diagram showing functional blocks of the intermediate DNS resolver node. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the method illustrated in FIG. 4, comprising a storing manager unit 8o and a communication manger unit 81. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The storing manger 80 is for secure DNS queries. This module corresponds to the step S220 of FIG. 4. This module can e.g. be implemented by the processing circuitry 20 of FIG. 7, when running the computer program.

The communication manager 81 is for secure DNS queries. This module corresponds to the steps S200, S210, S230, S240, and S250 of FIG. 4. This module can e.g. be implemented by the processing circuitry 20 of FIG. 7, when running the computer program.

An embodiment of a computer program 23, 25 for secure DNS queries is presented with reference to FIG. 7. The computer program comprises computer program code which, when run in an intermediate DNS resolver node, causes the intermediate DNS resolver node to receive a DNS message with an encrypted DNS query from a DNS client, together with an IP address for an additional DNS resolver, store a query ID of, and an IP address to, the DNS client, and to send a DNS message with the received encrypted DNS query to the additional DNS resolver with the stored query ID of, and the IP address to, the DNS client replaced with a query ID of the intermediate DNS resolver and an IP address thereto.

A computer program product 22, 24 comprising a computer program 23, 25 and a computer readable storage means on which the computer program 23, 25 is stored, is also presented.

Figure 8:
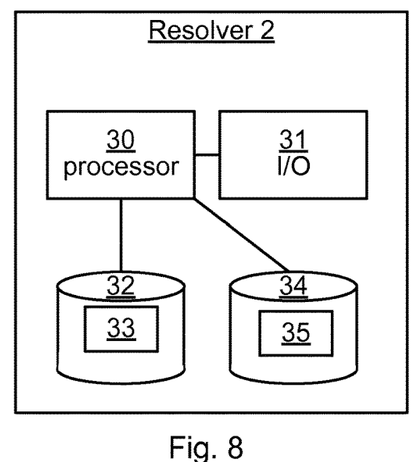

An embodiment of a final secure DNS resolver node for secure DNS queries is presented with reference to FIG. 8. The final DNS resolver node comprises a processing circuitry 30 and a computer program product 32, 34 storing instructions 33, 35 that, when executed by the processing circuitry, causes the final DNS resolver node to receive a DNS message with an encrypted DNS query and session key from an intermediate DNS resolver, the received DNS message being without a query ID of, and an IP address to, a DNS client having encrypted the encrypted DNS query and session key, decrypt the received encrypted DNS query and session key, obtain a DNS answer to the decrypted DNS query, encrypt the DNS query and answer with the decrypted session key, and to send a DNS message with the encrypted DNS query and answer to the intermediate DNS resolver.

The DNS query and the created session key may be received in the same RR.

The received DNS message may indicate an ID of the intermediate DNS resolver.

FIG. 8 is a schematic diagram showing some components of the final secure DNS resolver node Resolver 2. The processing circuitry 30 may be provided using any combination of one or more of a suitable central processing unit, CPU, multiprocessing circuitry, microcontroller, digital signal processing circuitry, DSP, application specific integrated circuit etc., capable of executing software instructions of a computer program 33 stored in a memory. The memory can thus be considered to be or form part of the computer program product 32. The processing circuitry 30 may be configured to execute methods described herein with reference to FIG. 5.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 34 in the form of a data memory may also be provided, e.g. for reading and/or storing data during execution of software instructions in the processing circuitry 30. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 35, to improve functionality for the final secure DNS resolver node.

The final secure DNS resolver node may further comprise an input/output (I/O) interface 31 including e.g. a user interface. The final secure DNS resolver node may further comprise a receiver configured to receive signalling from other nodes, and a transmitter configured to transmit signalling to other nodes (not illustrated). Other components of the final secure DNS resolver node are omitted in order not to obscure the concepts presented herein.

Figure 11:
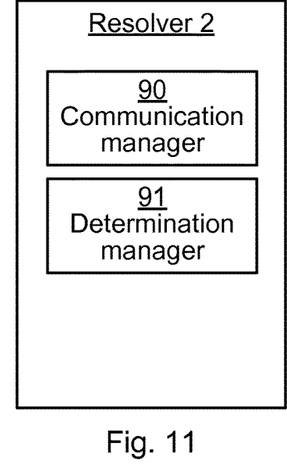

An embodiment of a final secure DNS resolver node for secure DNS queries is presented with reference to FIG. 11. The final secure DNS resolver node comprises a communication manager 90 for receiving S300 a DNS message with an encrypted DNS query and session key from an intermediate DNS resolver, the received DNS message being without a query ID of, and an IP address to, a DNS client having encrypted the encrypted DNS query and session key, decrypting S310 the received encrypted DNS query and session key, encrypting S330 the DNS query and answer with the decrypted session key, and sending S340 a DNS message with the encrypted DNS query and answer to the intermediate DNS resolver, and a determination manager 91 for obtaining S320 a DNS answer to the decrypted DNS query.

FIG. 11 is a schematic diagram showing functional blocks of the final secure DNS resolver node. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the method illustrated in FIG. 5, comprising a communication manager unit 90 and a determination manger unit 91. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The communication manager 90 is for secure DNS queries. This module corresponds to the steps S300, S310, S330 and S340 of FIG. 5. This module can e.g. be implemented by the processing circuitry 30 of FIG. 8, when running the computer program.

The determination manger 91 is for secure DNS queries. This module corresponds to the step S320 of FIG. 5. This module can e.g. be implemented by the processing circuitry 30 of FIG. 8, when running the computer program.

An embodiment of a computer program 33, 35 for secure DNS queries is presented with reference to FIG. 8. The computer program comprises computer program code which, when run in a final DNS resolver node, causes the final DNS resolver node to receive a DNS message with an encrypted DNS query and session key from an intermediate DNS resolver, the received DNS message being without an IP address to, and a query ID of, a DNS client having encrypted the encrypted DNS query and session key, encrypt the received encrypted DNS query and session key, obtain a DNS answer to the decrypted DNS query, encrypt the DNS query and answer with the decrypted session key, and to send a DNS message with the encrypted DNS query and answer to the intermediate DNS resolver.

A computer program product 32, 34 comprising a computer program 33, 35 and a computer readable storage means on which the computer program 33, 35 is stored, is also presented.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for secure domain name system, DNS, queries, the method being performed in a DNS client, the method comprising:
   obtaining an encryption key and internet protocol, IP, address for a final DNS resolver;
   creating a session key;
   encrypting a DNS query and the created session key with the obtained encryption key;
   sending a DNS message containing the encrypted DNS query and the created session key to an intermediate DNS resolver, different from the final DNS resolver, together with the obtained IP address for the final DNS resolver; and
   the DNS message having an OPCODE type indicating an enveloped DNS query.

2. The method according to claim 1, further comprising:
   receiving a DNS message with an encrypted DNS query and answer from the intermediate DNS resolver; and
   decrypting the received DNS query and answer with the created session key.

3. The method according to claim 1, wherein the DNS query and the created session key are sent in the same resource record, RR.

4. A method for secure domain name system, DNS, queries, the method being performed in an intermediate DNS resolver, the method comprising:

receiving a DNS message with an encrypted DNS query from a DNS client, together with an internet protocol, IP, address for an additional DNS resolver;

storing a query identity, ID, of and an IP address to the DNS client;

sending a DNS message with the received encrypted DNS query to the additional DNS resolver with the stored IP address to and the query ID of the DNS client replaced with a query ID of the intermediate DNS resolver and an IP address thereto; and the DNS message having an OPCODE type indicating an enveloped DNS query.

5. The method according to claim 4, further comprising:
receiving a DNS message with an encrypted DNS query and answer from the additional DNS resolver; and sending the received DNS query and answer to the DNS client based on the stored query ID of the DNS client.

6. The method according to claim 4, further comprising:
obtaining the IP address to the DNS client based on the received DNS message from the DNS client.

7. The method according to claim 4, wherein the DNS query and the created session key are received in the same resource record, RR.

8. The method according to claim 4, wherein the query ID of the intermediate DNS resolver is different from the stored query ID of the DNS client.

9. The method according to claim 4, wherein the step of receiving comprises decrypting the received encrypted DNS query from a DNS client, to get a next layer of an encrypted DNS query.

10. A method for secure domain name system, DNS, queries, the method being performed in a final DNS resolver, the method comprising:
receiving a DNS message with an encrypted DNS query and session key from an intermediate DNS resolver, the received DNS message being without an internet protocol, IP, address to and an query identity, ID of, a DNS client having encrypted the encrypted DNS query and session key;

decrypting the received encrypted DNS query and session key;

obtaining a DNS answer to the decrypted DNS query;
encrypting the DNS answer with the decrypted session key;

sending a DNS message with the encrypted DNS query and answer to the intermediate DNS resolver; and the DNS message having an OPCODE type indicating an enveloped DNS query.

11. The method according to claim 10, wherein the DNS query and the created session key are received in the same resource record, RR.

12. The method according to claim 10, wherein the received DNS message indicates a query ID of the intermediate DNS resolver.

13. The method according to claim 10, wherein the DNS query is encrypted with the decrypted session key.

14. An intermediate domain name system, DNS, resolver node for secure DNS queries, the intermediate DNS resolver node (resolver 1) comprising:
a processing circuitry; and
a computer storage medium storing instructions that, when executed by the processing circuitry, cause the intermediate DNS resolver node to:
receive a DNS message with an encrypted DNS query from a DNS client, together with an internet protocol, IP, address for an additional DNS resolver;

store a query identity, ID, of and an IP address to the DNS client; and send a DNS message with the received encrypted DNS query to the additional DNS resolver with the stored IP address to and the ID of the DNS client replaced with a query ID of the intermediate DNS resolver and an IP address thereto; and the DNS message having an OPCODE type indicating an enveloped DNS query.

15. The intermediate DNS resolver node according to claim 14, further caused to:
receive a DNS message with an encrypted DNS query and answer from the additional DNS resolver; and
send the received DNS query and answer to the DNS client based on the stored query ID of the DNS client.

16. The intermediate DNS resolver node according to claim 14, further caused to:
obtain the IP address to the DNS client based on the received DNS message from the DNS client.

17. The intermediate DNS resolver node according to claim 14, wherein the DNS query and the created session key are received in the same resource record, RR.

18. The intermediate DNS resolver node according to claim 14, wherein the query ID of the intermediate DNS resolver is different from the stored query ID of the DNS client.

19. The intermediate DNS resolver according to claim 14, further caused to decrypt the received encrypted DNS query from the DNS client, to get a next layer of encrypted DNS query.

* * * * *